United States Patent [19]

Tilley et al.

[11] 4,060,734

[45] Nov. 29, 1977

[54] APPARATUS FOR MEASURING IRREGULAR AREAS AND THICKNESSES

[75] Inventors: Leslie Joseph Tilley, Edinburgh; Bernard Dugdale, Roslin, both of Scotland

[73] Assignee: Forth Instruments Limited, Midlothian, Scotland

[21] Appl. No.: 667,934

[22] Filed: Mar. 18, 1976

[30] Foreign Application Priority Data

Mar. 25, 1975 United Kingdom ............... 12343/75

[51] Int. Cl.$^2$ .................................................. G01N 21/30
[52] U.S. Cl. .................................... 250/560; 33/147 L
[58] Field of Search ............. 33/143 L, 147 L, 147 N, 33/148 H; 250/560, 561, 222, 223

[56] References Cited

U.S. PATENT DOCUMENTS

| | | | |
|---|---|---|---|
| 2,858,614 | 11/1958 | Schoenemann | 33/148 H |
| 3,403,447 | 10/1968 | Taylor | 33/148 H |
| 3,892,043 | 7/1975 | Bonikowski | 33/147 N |
| 3,962,792 | 6/1976 | Stepanek et al. | 33/147 L |

Primary Examiner—David C. Nelms
Attorney, Agent, or Firm—William Anthony Drucker

[57] ABSTRACT

The invention relates to apparatus for measuring the area and thickness of irregular articles such as animal pelts or skins. The apparatus broadly comprises a non-reflective conveyor support for articles to be measured, a series of photo-electric cells extending across said conveyor support, light means for illuminating an article on the support from above and by reflection from the article energizing such cells as register with the article, electronic means for correlating the corresponding increments of movements of the article and the sum of increments between photo-electric cells energized and computing therefrom the area of the article; at least one electrical to mechanical transducer positioned so as to bear against the article and be adjusted by varying thicknesses thereof, and measurement indicating means connected to said transducer responsive to the electrical output therefrom and adapted to indicate and/or record the thicknesses detected by the transducer.

10 Claims, 5 Drawing Figures

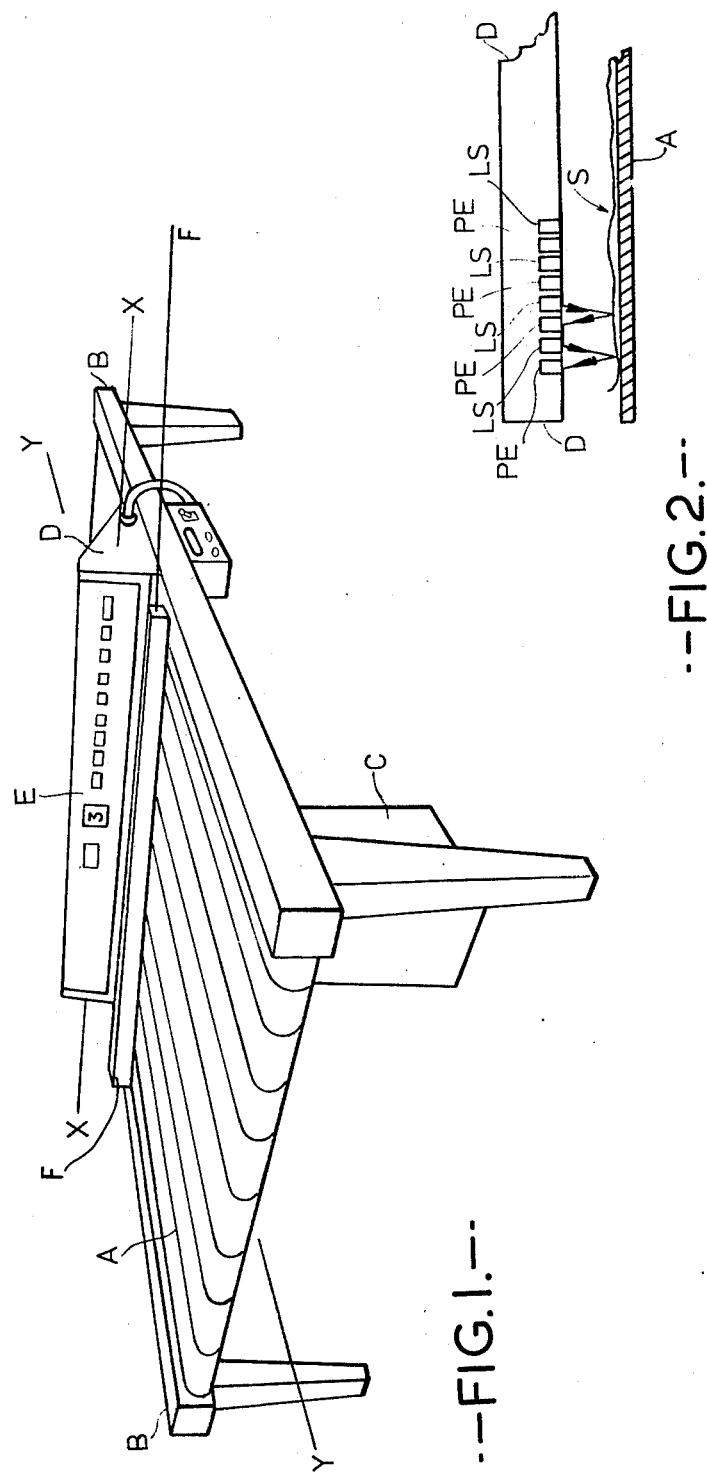

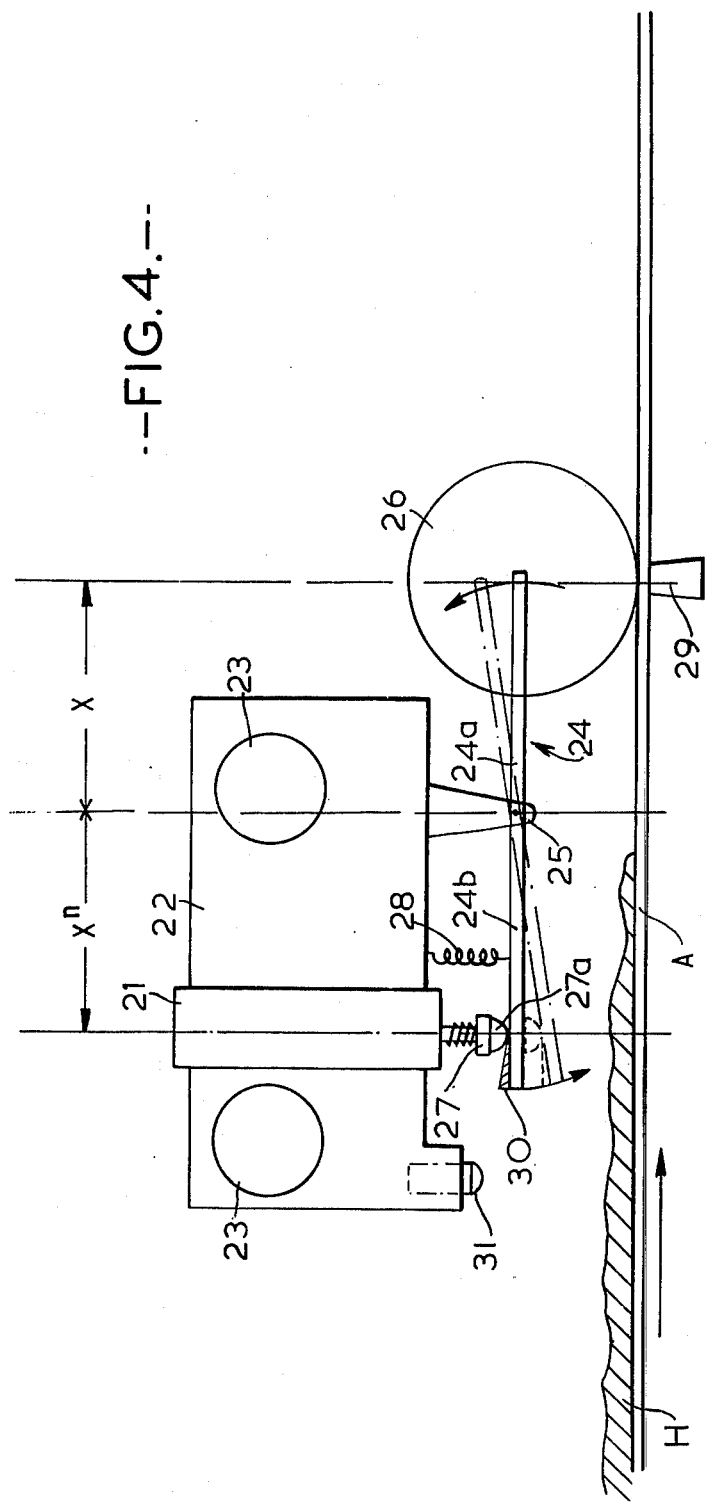

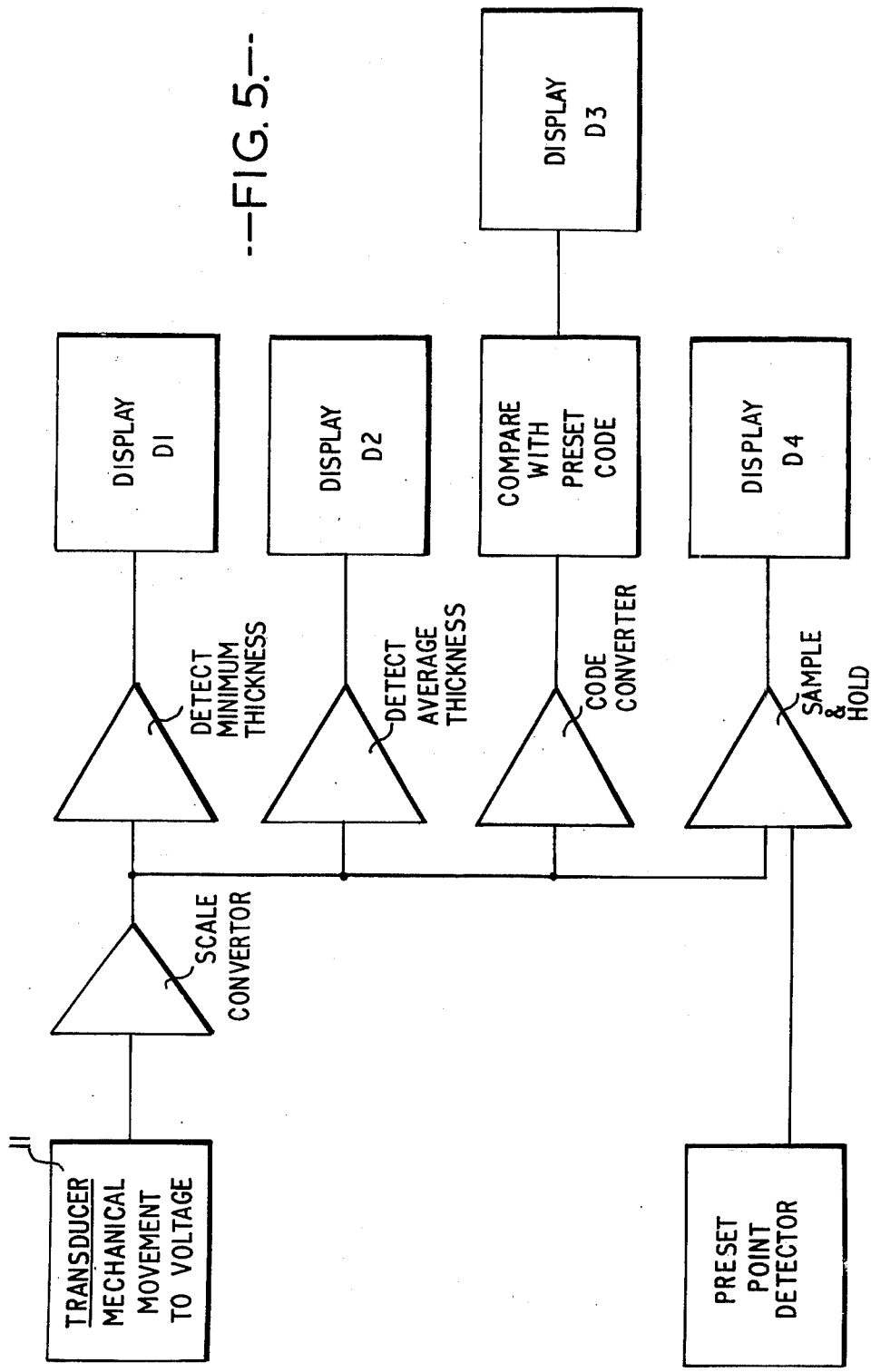

APPARATUS FOR MEASURING IRREGULAR AREAS AND THICKNESSES

This invention relates to apparatus for measuring irregular areas and thicknesses, for example, the areas and thicknesses of animal pelts and skins, and is concerned with improvements in or modifications of the apparatus as described in our prior British Pat. No. 1,421,550 of Jan. 16, 1974.

In our above mentioned Patent there is described apparatus, for measuring the surface area of an irregular article e.g. a pelt or skin, which broadly comprises a support for the article said support having a non-reflective surface as compared with that of the article, a series of photo-electric cells extending across and above said support and spaced from each other by a predetermined increment, means for causing relative movement at a predetermined speed between the support and the photo-electric cells in a direction normal to said series of cells, light means for illuminating an article on the support from above and by reflection from the article energising at predetermined intervals of time as the article is moved under the series of photo-electric cells such of said cells as register with the article, said electronic means for correlating the corresponding increments of movement of the article and the sum of increments between photo-electric cells energised and computing therefrom the area of the article.

According to the present invention apparatus as above defined further comprises means for measuring variations in the thickness of the article as it is moved through the apparatus, said means including at least one mechanical to electrical transducer positioned so as to bear against the article and be adjusted by the varying thickness thereof, and measurement indicating means connected to said transducer and responsive to the electrical output therefrom and adapted to indicate and/or record the thicknesses detected by the transducer.

Where the apparatus includes a conveyor for a series of the articles to be measured, the thickness measuring means may be positioned so as to measure the thickness of the article either before or after or during the measuring of its irregular surface area.

In one preferred embodiment of the invention the transducer is mechanically linked to an arm or lever device which bears on the article as it is conveyed through the apparatus, the arrangement being such that as the article moves under said arm or lever device the latter will be adjusted according to the thickness of the article at the point where the arm or lever device is in contact therewith. The movements of the arm or lever device are transmitted to the transducer which is correspondingly adjusted so as to give a voltage output directly proportional to the thickness of the article. This voltage after suitable scaling may be displayed on voltmeter-type or other display means arranged so as to provide a direct read out in units of thickness, e.g. millimeters. The voltage can be processed electronically to display:
1. The minimum thickness detected;
2. The average thickness detected;
3. The percentage above or below a specified thickness; and
4. The thickness at a predetermined point.

The output from the transducer may also be fed into a recorder to produce a graph or other representation of the thickness of the pelt, hide or other article.

Preferably the part of the arm or lever device which bears on the article is in the form of rotary member, e.g. a wheel or roller.

One particular embodiment of the invention will now be described, by way of example only, when the aid of the accompanying drawings wherein, FIG. 1 is a perspective view of apparatus for measuring the area and thickness more particularly of pelts or skins.

FIG. 2 is a fragmentary cross-section depicting the arrangement of the photo-electric cells and their light sources.

FIG. 4 illustrates diagrammatically thickness measuring means as applied to the apparatus of FIGS. 1 to 3, and FIG. 5 is a block diagram illustrating one form of circuitry for the thickness measuring means.

Figure 3:
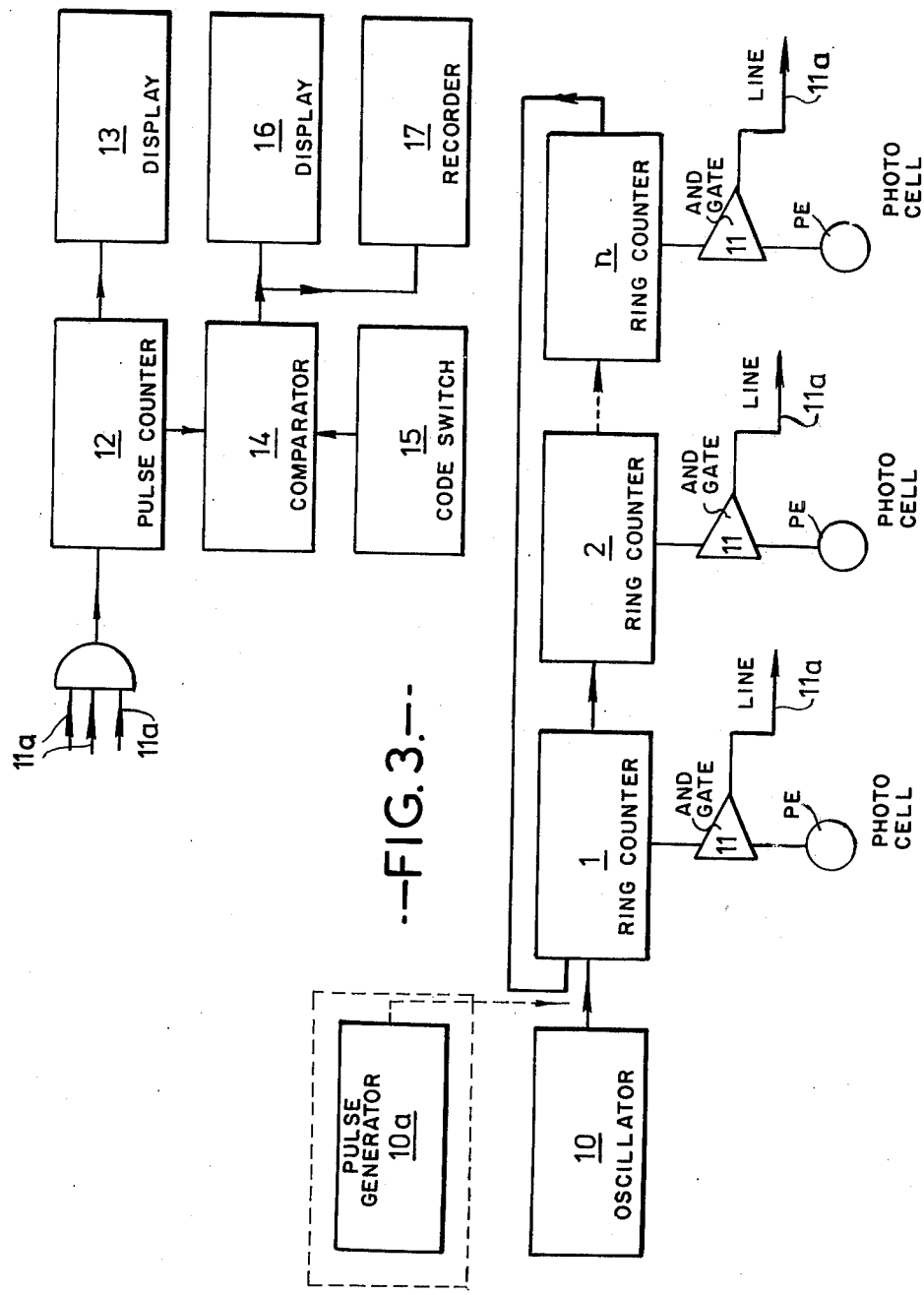
FIG. 3 is a block diagram illustrating one form of circuitry for the area measuring part of the apparatus.

Referring first to said FIGS. 1-3 of the drawings, A denotes an imperforate endless conveyor belt mounted on rollers of a main frame B and driven from a drive motor C. The belt A is of a non-reflective nature, having for example a matt finish and being black in colour.

Mounted on said main frame B transversely over the belt A is a scanning head D incorporating a digital display panel E and a series of photo-electric cells PE (FIG. 2) and light sources LS. Said cells PE and light sources LS are arranged on an axis X which is normal to the axis Y of the belt A. As will be seen most clearly in FIG. 2, the cells PE and light sources LS are arranged on the same side of the belt A, said cells PE being energised when light from said sources LS is reflected (as indicated by the arrows) by a pelt or skin S passing below same on the belt A. F denotes a bridge carring the thickness measuring means which extends transversely of the belt A.

FIG. 3 illustrates by means of block diagrams the general circuitry of the area measuring apparatus only a few of the photo-electric cells and their associated devices being depicted.

In said circuitry of FIG. 3, 10 indicates an electronic oscillator which generates pulses having a frequency which is a function of the fixed speed of the conveyor belt. If the speed of the conveyor belt is variable the oscillator 10 is replaced by a mechanical pulse generator 10a. In either case the pulses are fed to a ring counter comprising stages 1, 2 ... n.

Each stage of the ring counter is associated with an AND gate 11 which also has associated with it one of the photo-electric cells PE. As will be understood, only if an AND gate 11 receives a signal from both its associated stage of the ring counter and from its associated photo-electric cell with a pulse be transmitted, over a line 11a, to the pulse counter 12. The number of pulses transmitted at any one time will, of course, depend on the width of the strip of pelt scanned by the photo-electric cells PE at that particular time. The pulses from the pulse counter 12 are fed to a display 13 which gives a read out of the area, scanned in for example, square feet.

The pulses from the pulse counter are also fed to a comparator 14 which also receives pulses from a code switch 15 and compares the pulses to indicate the appropriate code size for the pelt, in a display 16. The output from the comparator is also fed to a total recorder 17 which provides a record of the total area of the pelt.

Referring to FIG. 4 of the drawings, A indicates the conveyor belt of the above described apparatus and 21 a mechanical to electricl voltage transducer mounted on a carrier 22. The carrier 22 is slidably supported on bars 23 which expand transversely over the conveyor A being carried by the bridge F. Said bridge F may be located in front or rearwardly of the scanning head D.

The carrier 22 also supports a lever 24 which is pivoted at 25. One arm 24a of the lever 24 is provided with a rotary member 26. The other arm 24b of the lever 24 is located under and in operable contact with the vertically adjustable, spring loaded, rod or plunger 27 of the transducer 21. The latter is of the linear displacement type which will produce a DC voltage proportional to the distance moved by the sensing rod or plunger 27.

A spring 28 acts to urge the arm 24a downwardly and the arm 24b upwardly.

A datum element, e.g. a block or roller 29 is located below the conveyor A in register with the rotary member 26 in order to maintain the conveyor at this point at a predetermined height relative to the transducer.

The rod 27 of the transducer has sliding contact 27a in engagement with the end of the arm 24b of the lever 24, so as to avoid shock, and to compensate for variations in the operative lengths X and $X^n$, of the lever arms 24a and 24b the end of arm 24b is formed or provided with a wedge surface 30.

A photocell 31 is provided on the carrier 22 to detect the presence of a hide to be measured and thereby avoid ambiguity when the roller 26 is in "zero" position, i.e. is in contact with the belt 10.

It will be understood that as a hide H passes under the member 26 the latter will rise and fall in accordance with the thickness of the hide. This movement will be transmitted by the lever 24 to the rod 27 of the transducer 21, which latter will give a corresponding voltage output. The output voltage may be fed to a voltmeter-type display instrument designed to give a reading directly in suitable units of thickness, e.g. millimeters or digital display units. Additionally the output voltage may be processed electronically so as to display the smallest and largest readings obtained and also the mean average reading.

The transducer 21 may be adjusted transversely of the hide, on the bars 23, so as to provide thickness readings at different positions across the width of the hide.

If desired, there may be provided a series of transducers as described spacedly positioned across the conveyor so as to measure the thickness of a hide at a plurality of points across the width thereof. The obtained measurements may be displayed separately or integrated and processed to give an average reading.

Referring to FIG. 5 this illustrates by means of a block diagram the general circuitry layout of a thickness measuring means particularly suited to the measuring of pelts and skins. Four display units are included, display unit D1 providing a digital display of minimum thicknesses, D2 a digital display of average thicknesses, D3 the percentage above or below a specified certain thickness, and D4 the thickness of a pelt or skin at a predetermined point, e.g. the shoulder. The minimum and average detector means can be standard sample and hold circuits. The code converter changes analogue signals to digital signals which are compared with a present code to provide the display at D3. The sample and hold unit samples at one and a particular instant, as determined by the present point detector, in order to provide the display at D4. The preset point detector includes a time delay circuit which enables a particular point on a pelt or skin to be determined with reference to the edge of the pelt or skin.

We claim:

1. Apparatus for measuring the surface area and thickness of an irregular article, comprising a conveyor for the article, said conveyor having a substantially non-reflective surface, a series of photo-electric cells extending across and above said conveyor and spaced from each other by a predetermined distance, means for moving said conveyor at a predetermined speed relative to said photo-electric cells and in a direction normal to the line on which said series of cells are arranged, light means for illuminating an article on the conveyor from above and by reflection from the article engerizing as the article is moved under the series of photo-electric cells such of said cells as register with the article, means for sampling the output from said cells at predetermined intervals of time, electronic means for computing from the corresponding increments of movement of the article between successive samplings and the corresponding sum of the distances between photo-electric cells energized the area of the article, and means for measuring variations in the thickness of the article comprising at least one mechanical to electrical transducer positioned so as to bear against the article and be adjusted by the varying thickness thereof, point detection means for detecting a predetermined position relative to the leading edge of the pelt and measurement indicating means connected to said transducer responsive to the electrical output therefrom and to the point detection means and arranged to as to indicate the thickness at the predetermined position.

2. Apparatus as claimed in claim 1, wherein the point detection means includes means for delaying a signal corresponding to the article leading edge and sampling means operable in response to the delayed signal to sample and store the output of the transducer.

3. Apparatus as claimed in claim 1, wherein said transducer comprises a pivotal arm having a rotary member which bears on an article as it is conveyed through the apparatus, movement of said arm by variations in thickness of the article being tansmitted to said transducer which is arranged so as to provide a voltage output directly proportional to the thickness of the article.

4. Apparatus, as claimed in claim 3, wherein said output voltage after appropriate scaling is displayed on display means so as to provide a direct read out in units of thickness.

5. Apparatus, as claimed in claim 4, wherein said output voltages of the transducers are processed electronically to display a. The minimum thickness detected,
   b. The average thickness detected,
   c. The percentage above or below a specified thickness, and
   d. The thickness of an article at a predetermined point.

6. Apparatus, as claimed in claim 5, including a recorder arranged to provide a graphical representation of the thickness of an article.

7. Apparatus, as claimed in claim 1, wherein said transducer is mounted on a carrier which is slidably located on a bar which extends transversely of the conveyor, said carrier having a spring influenced lever pivoted thereto one arm whereof is provided with a rotary member for bearing upon an article on the conveyor and the other arm whereof is in operative contact with a spring loaded sensing rod of the transducer, and said transducer is of linear displacement type providing a DC voltage proportional to the distance moved by said sensing rod.

8. Apparatus, as claimed in claim 7, wherein a datum element is located below the conveyor in register with the rotary member of the pivotal arm in order to maintain the conveyor at this point at a predetermined height relative to the transducer.

9. Apparatus as claimed in claim 8 wherein the sensing rod of the transducer has a sliding contact which is in engagement with said pivotal lever, and to compensate for variations in the operative lengths of the arms of said pivotal lever during its movement the end of the arm in contact with said sliding contact is provided with a ramped surface.

10. Apparatus, as claimed in claim 9, wherein a photocell is provided on said carrier of the transducer in order to detect the presence of an article to be measured.

* * * * *